A. O. DUPUY.
BRICKMAKING MACHINE.
APPLICATION FILED SEPT. 18, 1917.

1,363,853.

Patented Dec. 28, 1920.
12 SHEETS—SHEET 2.

Inventor:
Arthur O. Dupuy,
by Merkel & Saywell,
his attorneys.

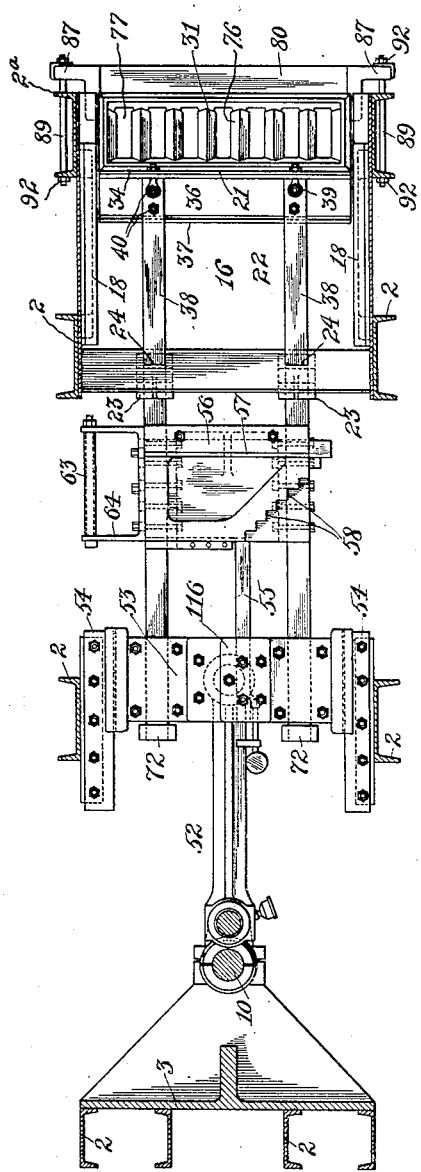
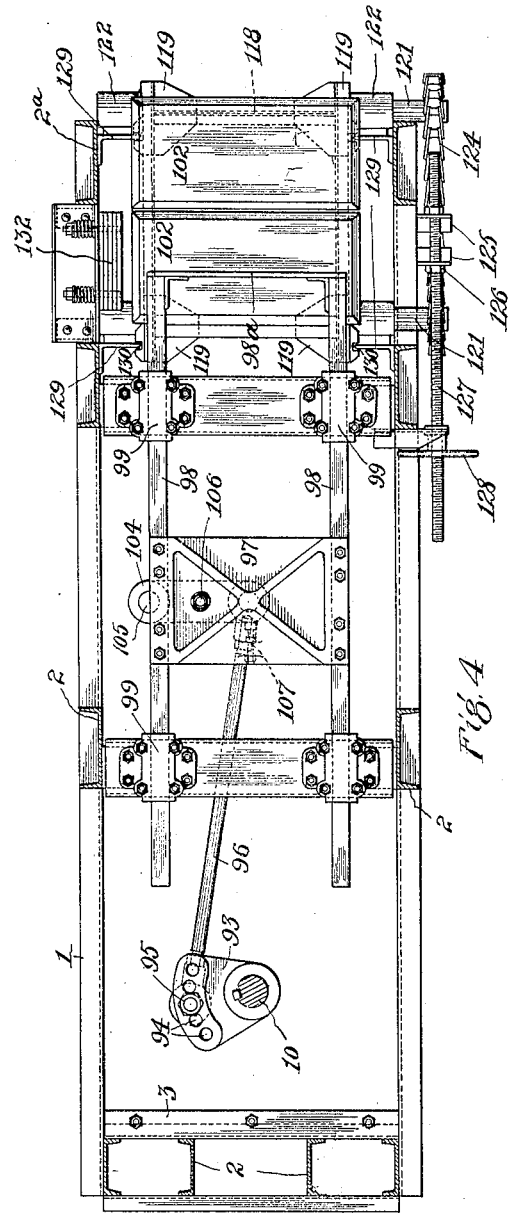

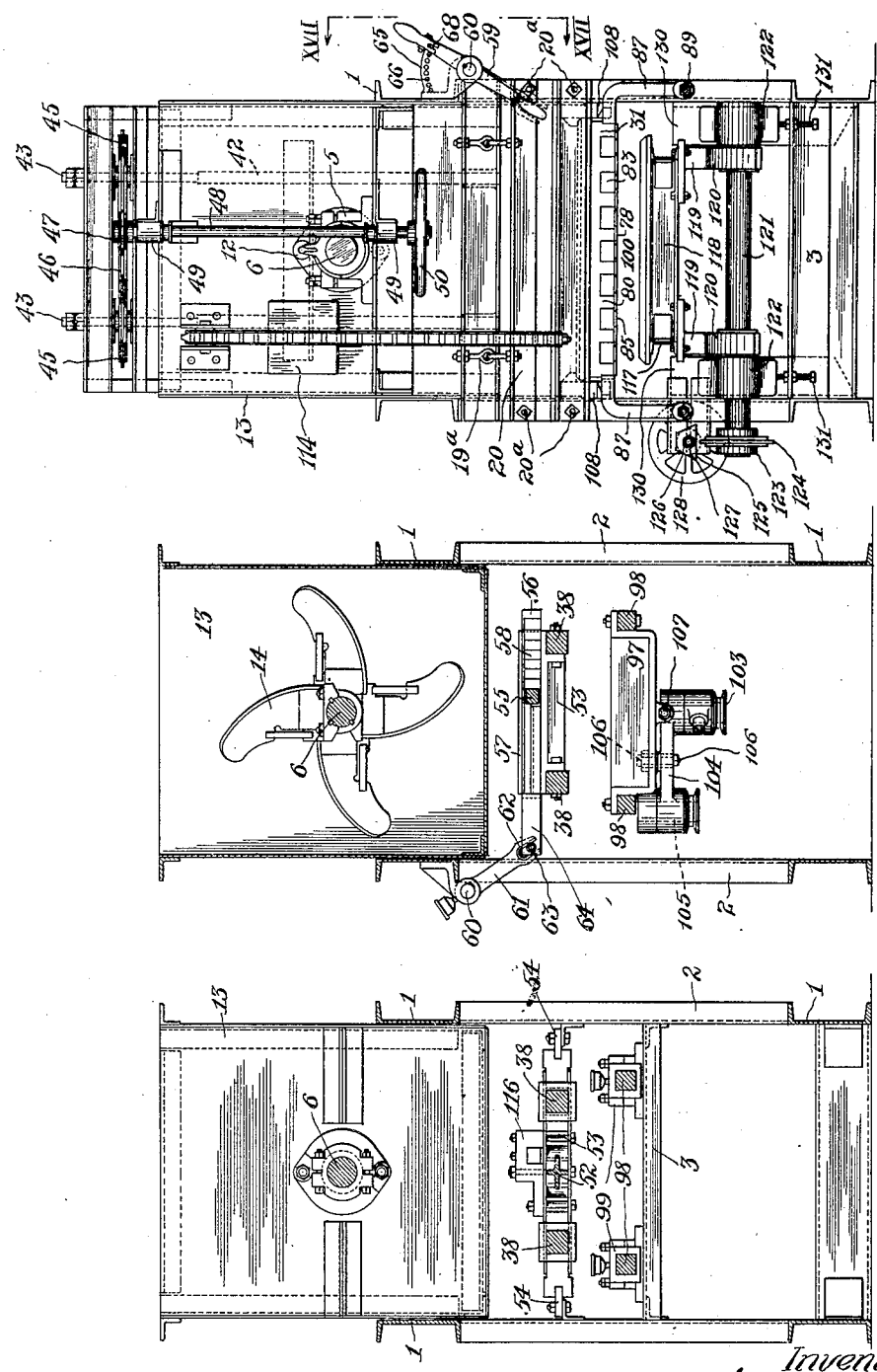

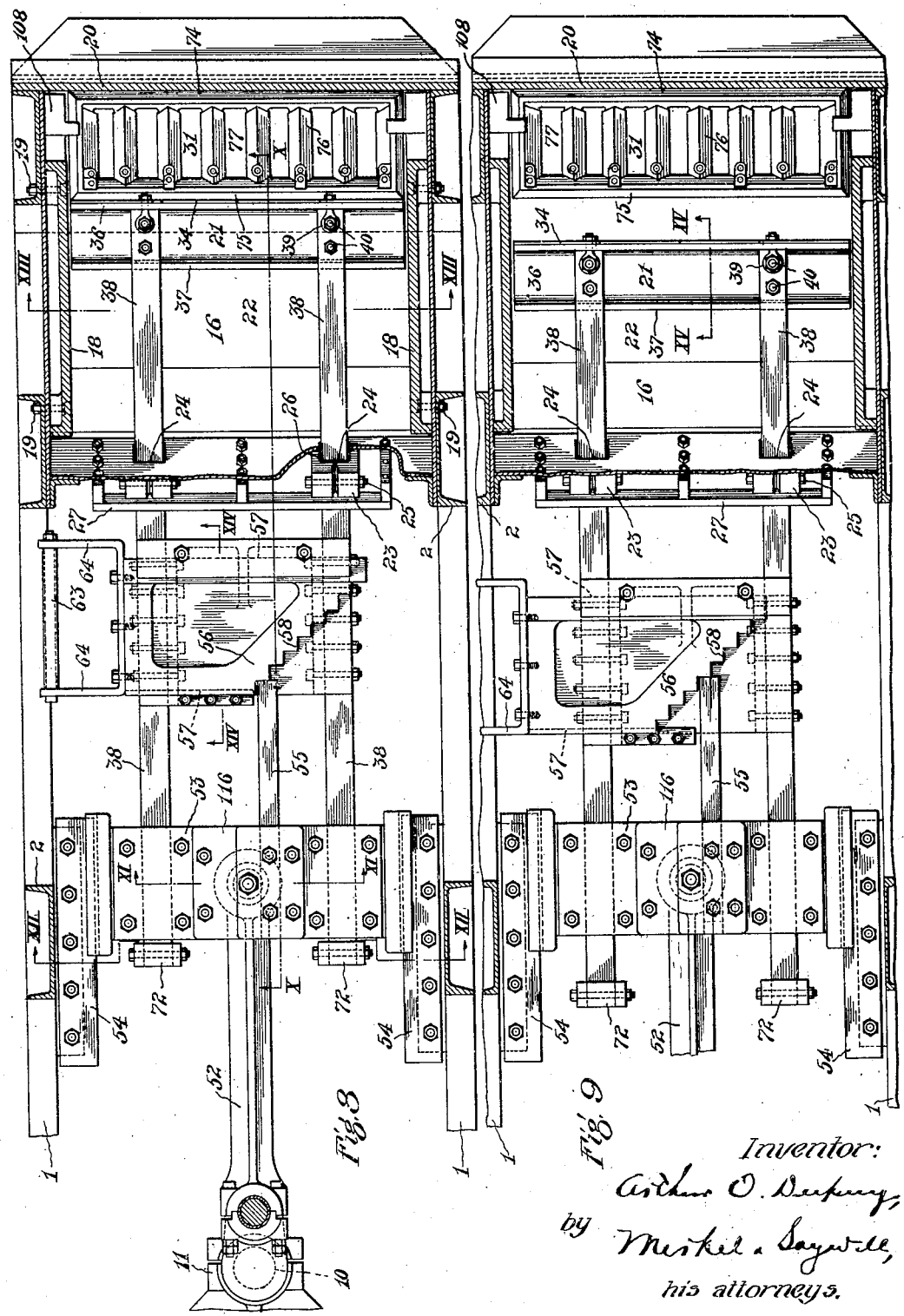

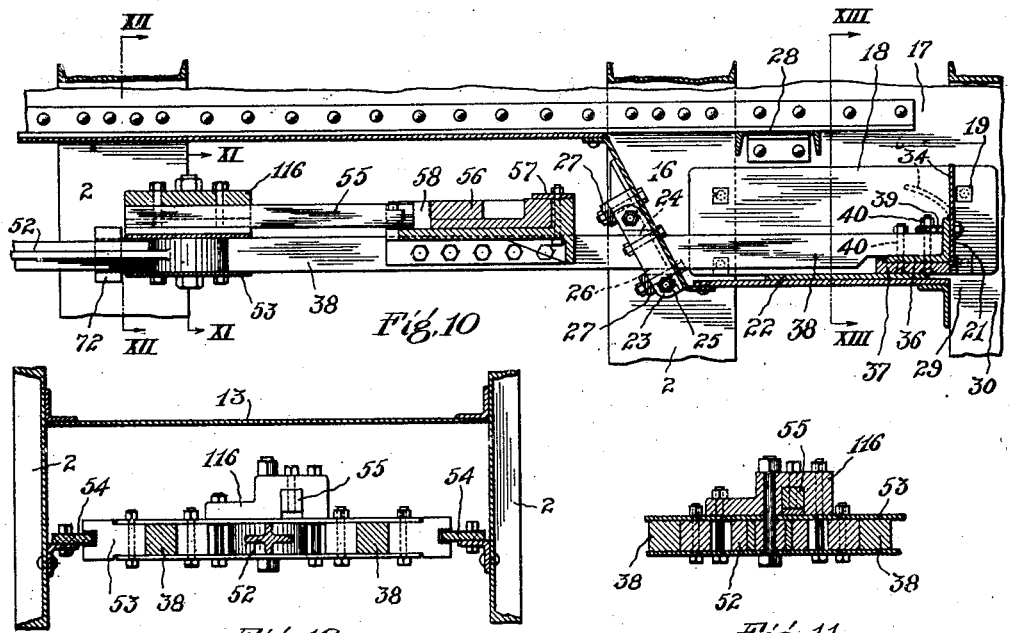

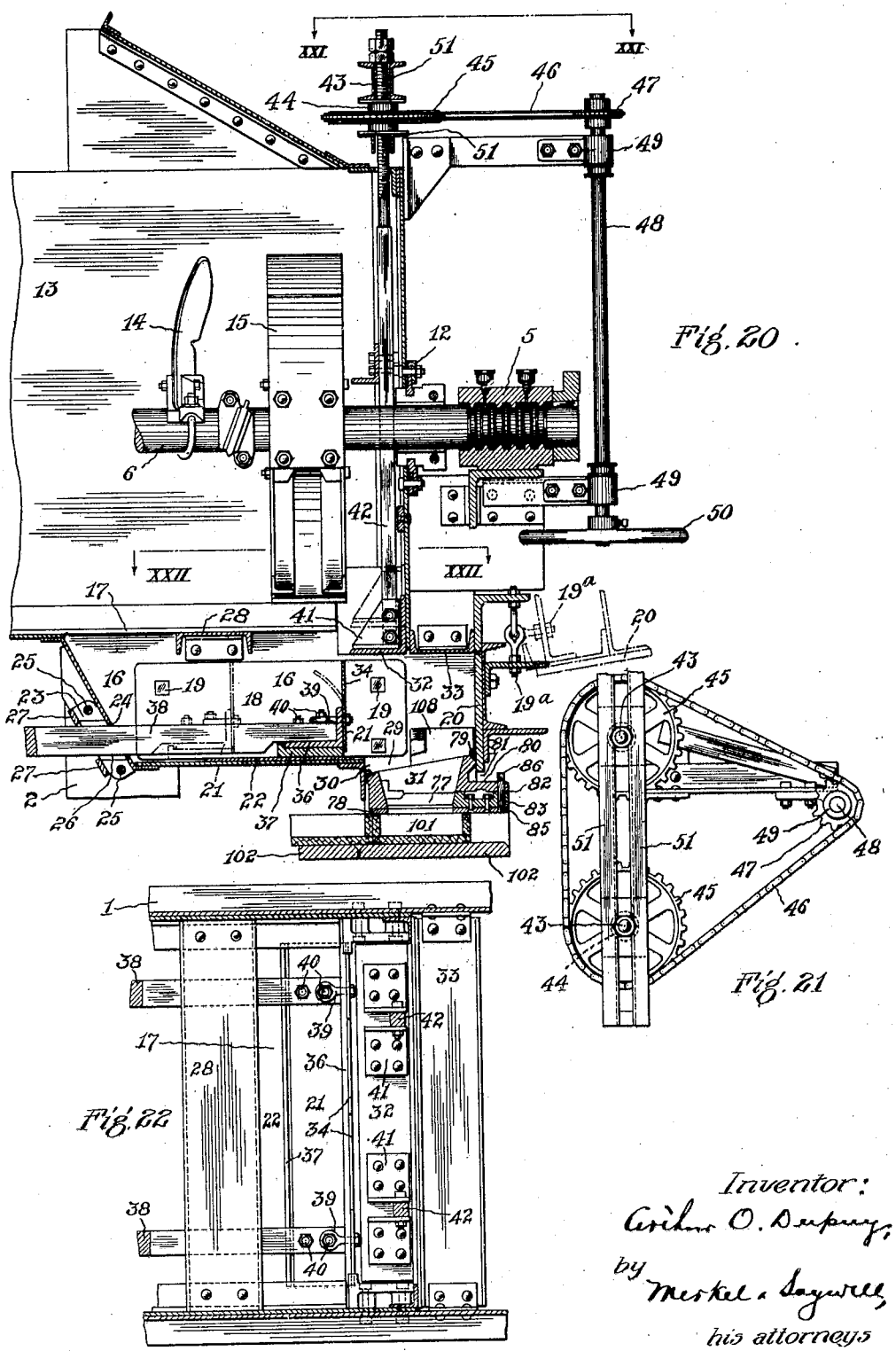

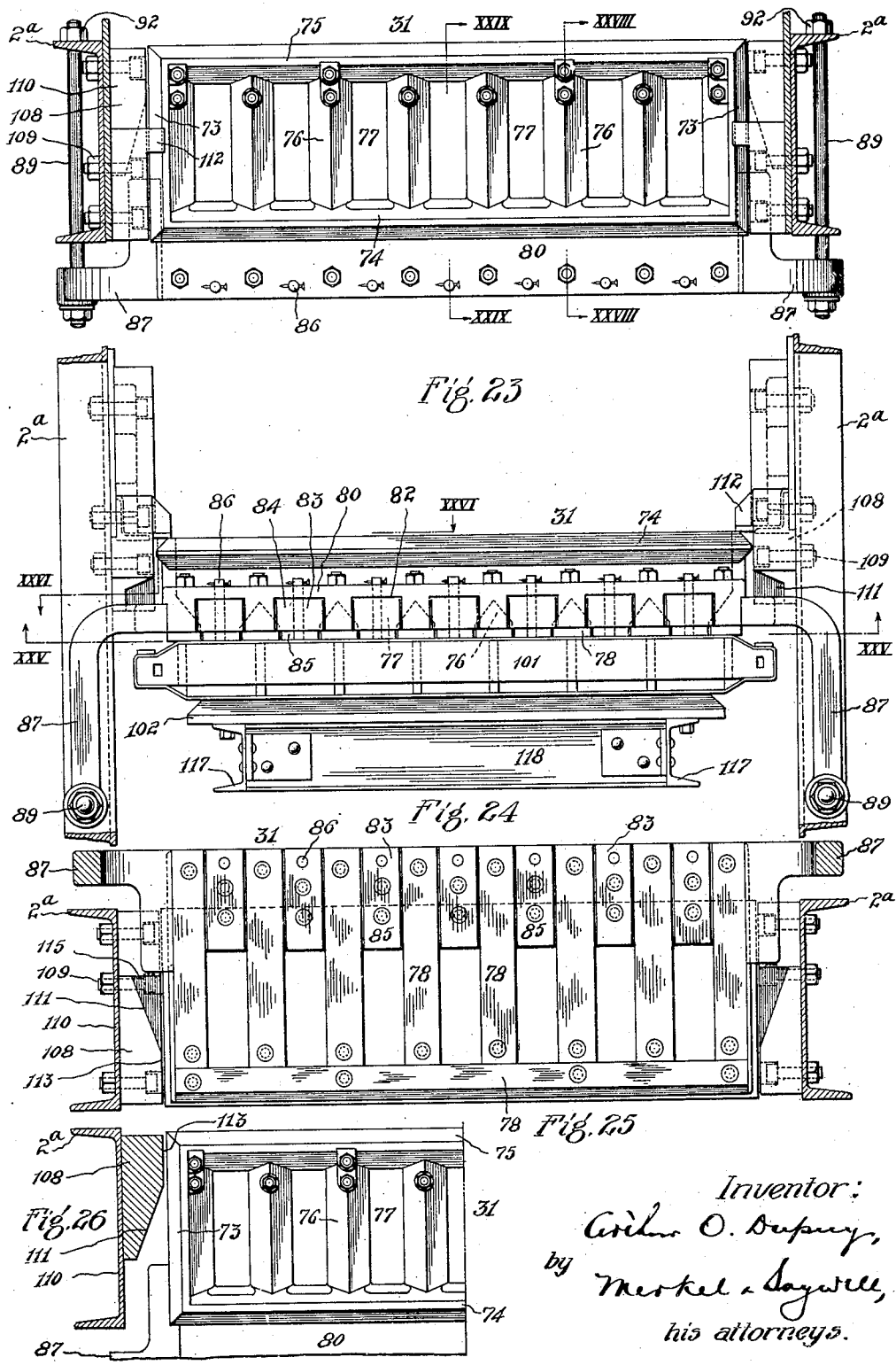

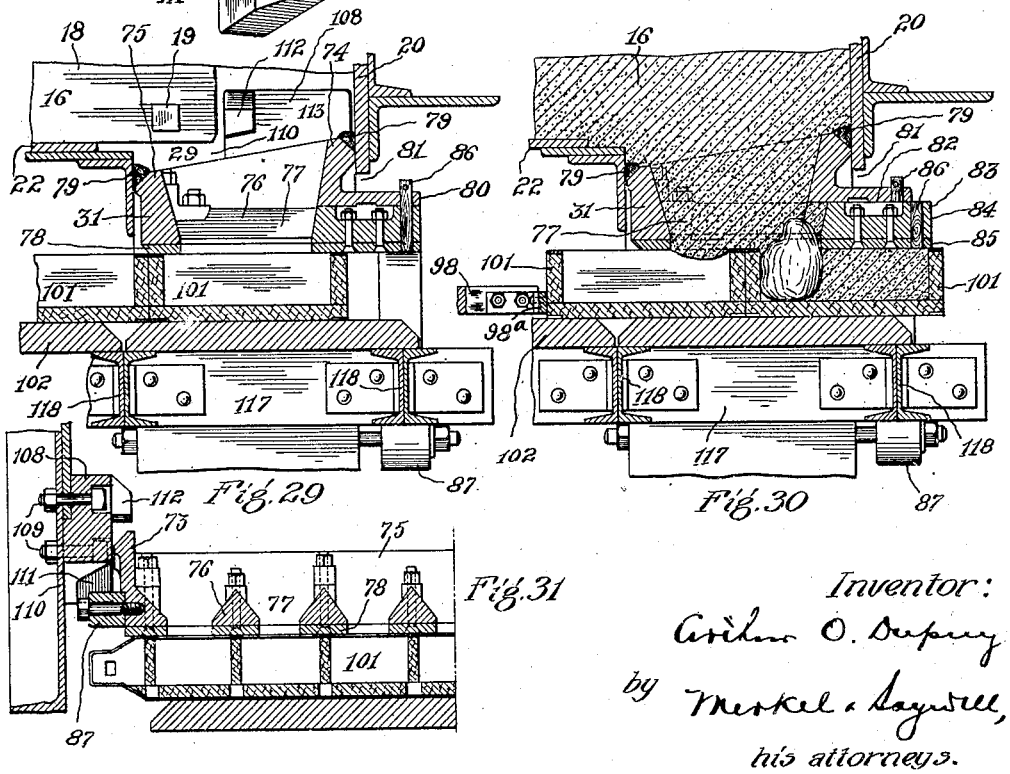

A. O. DUPUY.
BRICKMAKING MACHINE.
APPLICATION FILED SEPT. 18, 1917.

1,363,853.

Patented Dec. 28, 1920.
12 SHEETS—SHEET 11.

Inventor:
Arthur O. Dupuy
by Merkel & Sayrell,
his attorneys.

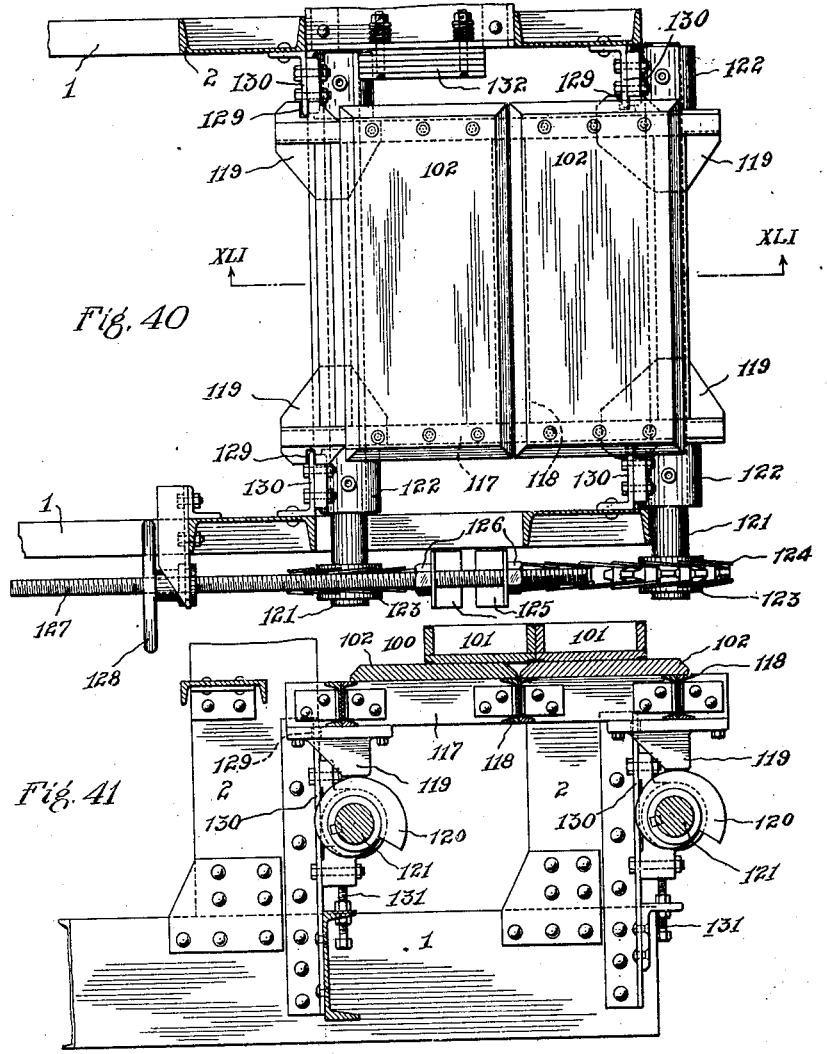
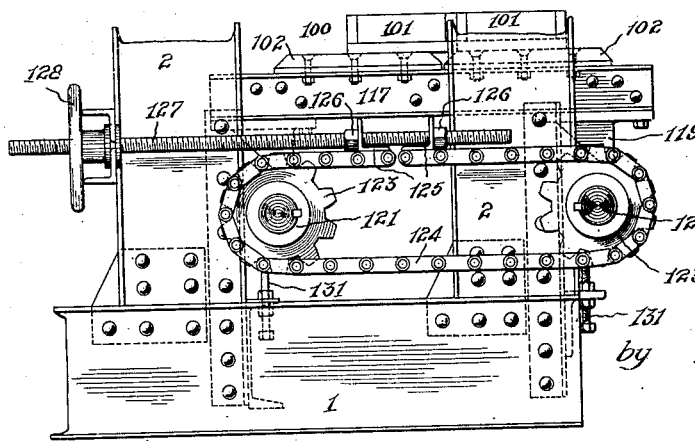

UNITED STATES PATENT OFFICE.

ARTHUR O. DUPUY, OF CLEVELAND, OHIO, ASSIGNOR OF ONE-HALF TO ERNEST W. FARR, OF CLEVELAND, OHIO.

BRICKMAKING-MACHINE.

1,363,853.  Specification of Letters Patent.  Patented Dec. 28, 1920.

Application filed September 18. 1917. Serial No. 191,942.

*To all whom it may concern:*

Be it known that I, ARTHUR O. DUPUY, a citizen of the United States, resident of Cleveland, county of Cuyahoga, and State of Ohio, have invented new and useful Improvements in Brickmaking - Machines, of which the following is a specification, the principle of the invention being herein explained and the best mode in which I have contemplated applying that principle, so as to distinguish it from other inventions.

My invention relates to brick-making machines, and particularly to that type of such machines which operate automatically.

The object of the invention is to construct a machine of the above described character which will be economical and efficient in its operation and embody as far as possible simplicity and economy of construction.

The said invention consists of means hereinafter fully described and particularly set forth in the claims.

The annexed drawings and the following description set forth in detail certain means embodying my invention, the disclosed means, however, constituting but one of various mechanical forms in which the principles of the invention may be employed.

In said annexed drawings:

Fig. 3 represents a horizontal section taken upon the plane indicated by line III—III in Fig. 2.

Fig. 4 represents a horizontal section taken upon the planes indicated by lines IV—IV in Fig. 2.

Fig. 5 represents a front elevation of the machine.

Fig. 6 represents a vertical transverse section taken upon the plane indicated by line VI—VI in Fig. 2.

Fig. 7 represents a vertical transverse section taken upon the plane indicated by line VII—VII in Fig. 2.

Fig. 8 represents, upon an enlarged scale, a horizontal section of a fragmentary portion of the machine and taken upon the plane indicated by line III—III, Fig. 2.

Fig. 9 represents a view similar to Fig. 8 but showing the parts in a different position.

Fig. 10 represents a vertical longitudinal fragmentary section taken upon the plane indicated by line X—X in Fig. 8.

Fig. 11 represents a detail section taken upon the plane indicated by line XI—XI in Fig. 10.

Fig. 12 represents a detail section taken upon the plane indicated by line XII—XII in Fig. 10.

Fig. 13 represents a detail section taken upon the plane indicated by line XIII—XIII, Fig. 10.

Fig. 14 represents a detail section taken upon the plane indicated by line XIV—XIV in Fig. 8.

Fig. 15 represents a detail section taken upon the plane indicated by line XV—XV in Fig. 9.

Fig. 16 represents a detail perspective view of one of the bearings for one of the plunger bars constituting the secondary portion of the plunger rod.

Fig. 20 represents, upon an enlarged scale, a vertical longitudinal section of a fragmentary portion of the machine and taken upon the plane passing through the axis of the pugging shaft.

Fig. 21 represents a plan of the upper portion of the mechanism shown in Fig. 20.

Fig. 22 represents a detail section taken upon the plane indicated by line XXII—XXII in Fig. 20.

Fig. 23 represents, upon an enlarged scale, a horizontal section of a fragmentary portion of the machine and taken immediately above the die, the latter being shown in top plan therein.

Fig. 24 represents, upon a scale similar to that of Fig. 23, a front elevation of that portion of the machine immediately adjacent to and including the die.

Fig. 25 represents a transverse section taken upon the plane indicated by line XXV—XXV in Fig. 24 and viewed upwardly, as indicated by the arrows.

Fig. 26 represents a fragmentary detail taken upon the planes indicated by lines XXVI—XXVI in Fig. 24.

Fig. 27 represents, upon an enlarged scale, a vertical transverse section of a fragmentary portion of the machine, including the die and parts adjacent thereto, the die being shown in side elevation therein.

Fig. 28 represents a section taken upon the plane indicated by line XXVIII—XXVIII, Fig. 23.

Fig. 29 represents a section taken upon the plane indicated by line XXIX—XXIX, Fig. 23.

Fig. 30 represents a section similar to that of Fig. 29 and showing the parts of the die in the position which they occupy when the stone-door is being removed by an obstruction.

Fig. 31 represents a section taken upon the plane indicated by line XXXI—XXXI, Fig. 28.

Fig. 32 represents a perspective view, upon an enlarged scale, of one of the guiding blocks for the die.

Fig. 33 represents, upon an enlarged scale, one of the stone-doors of the die.

Fig. 40 represents a fragmentary longitudinal section taken upon the plane indicated by line XL—XL in Fig. 2.

Fig. 41 represents a section taken upon the plane indicated by line XLI—XLI, Fig. 40.

Fig. 42 represents, upon an enlarged scale, a side elevation of a fragmentary portion of the machine including the mechanism for vertically adjusting the mold-supporting means.

The illustrated embodiment of my invention comprises the hereinafter-named main elements all coördinated to form one automatically operating brick-making machine, by which term I refer to those machines especially designed to take the basic material such as clay and mold it into the desired form, concomitantly feeding and ejecting the required molds.

These main elements consist of the main frame; the main driving means; the pugging-mill; the compression chamber and plunger coöperating therewith; the die; the molds and means for feeding and ejecting same; and the mold-adjusting means.

*The main frame.*—This part of the structure consists of a number of longitudinal beams and channel bars 1, upright members 2 of required cross-section, and transverse members 3, all suitably positioned and secured to support the remaining elements of the machine.

Figure 1:
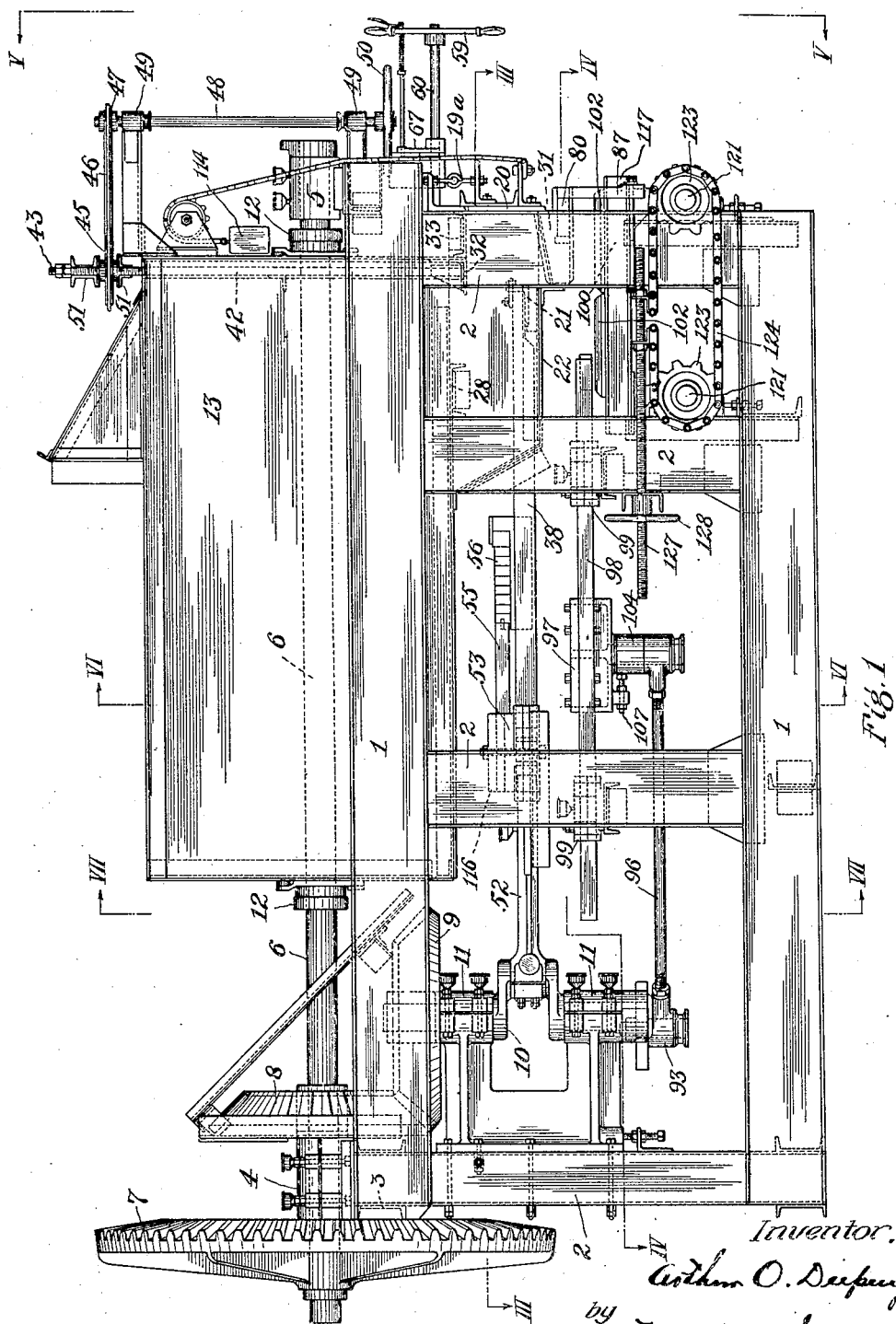
Figure 1 represents a side elevation of an automatically operating brick-making machine embodying my invention.

*The main driving means.*—At the front and rear of the machine are two main bearings 4 and 5, Fig. 1, both located outside of the pugging-mill receptacle, in which are mounted the main horizontal driving-shaft 6, to the rear end of which is secured the beveled driving-wheel 7 which is driven by an engaging beveled pinion (not shown) itself connected with and driven by a suitable motor (not shown). Also secured to the shaft is a secondary beveled driving-wheel 8 which meshes with a beveled gear 9 having a vertical axis and fixed to the upper end of a crank-shaft 10 mounted in suitable bearings 11, 11, Fig. 1. This crank-shaft is connected with the plunger and ejector mechanism of the machine hereinafter fully described.

The main-shaft 6 passes through the pugging-mill receptacle, suitable bushings 12, 12, being provided for its place of passage through the end walls of the said receptacle, as will be understood.

Figure 2:
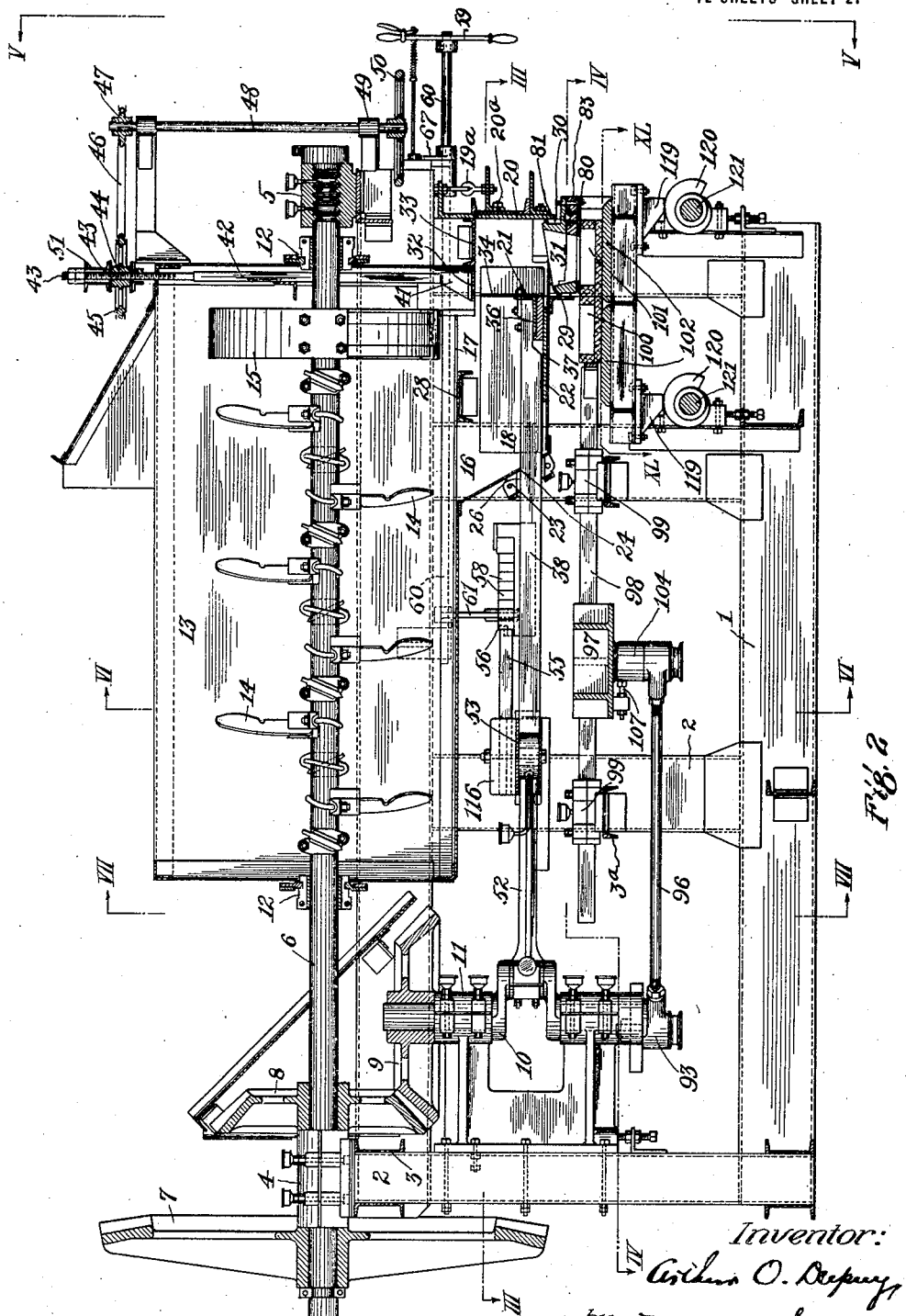
Fig. 2 represents a longitudinal section taken upon a plane parallel with the plane of elevation of Fig. 1 and passing through the axis of the pugging-shaft, the latter and other parts cut by said plane being shown in side elevation.

*The pugging mill.*—This part of the machine includes a receptacle 13 made of sheet-metal, of general rectangular structure and open at the top for the purpose of readily permitting the feeding thereinto of the basic material or clay, suitably prepared for its particular use in this connection. As previously pointed out, the main-shaft 6 passes through the receptacle, Fig. 2, and upon it are secured the pugging-blades 14 of any desired suitable construction, as well as the wiper 15, the latter being located in the front part of the receptacle and directly over the pressure-chamber 16. An opening 17 in the bottom of the front of the receptacle 13 furnishes communication between the latter and said chamber, in a manner hereinafter specifically pointed out.

*Operation of pugging mill.*—The suitably prepared clay being supplied to the receptacle, and the main-shaft being rotated, the blades churn the clay and feed it forward to the wiper which forces it down into the compression-chamber in a manner understood by those skilled in the art and as will therefore not need to be further described. A suitable clutch (not shown) is provided for starting and stopping the machine.

*The pressure-chamber and coöperating plunger.*—As before stated, the pressure-chamber 16 is located immediately below the wiper 15, Figs. 2, 3, 8, 9 and 20, and has located therein and respectively at each side thereof two wearing-plates 18, 18, secured to its sides by means of bolts 19, which receive the wear due to the abrasion of the clay while moving in the chamber, and which may be readily removed and replaced when necessary. The front wall of this chamber consists of a plate 20 hung upon eyed bolts 19a themselves depending from one of the transverse members 3, as shown in Fig. 20, whereby such plate may be swung outwardly and upwardly, as shown in dotted lines in said figure, so as to afford access to the interior of the chamber 16, when desired, for the purposes of inspection or repair. When the machine is in operation, this plate is, of course, fixedly secured in place to close the front of the chamber, any suitable means such as bolts 20a being utilized for this purpose. The rear wall of this chamber is inclined and is pierced by two bars carrying at their front ends the plunger 21, hereinafter more specifically described but which for the present may be described as a vertical transvese plate resting and sliding upon the bottom member 22 of the chamber, as shown in Fig. 20. Suitable bushings 23 are provided for preventing the escape of material through the apertures 24, 24, through which the aforementioned plunger bars extend, one of these bushings being illustrated in detail by Fig. 16, and consists of two parts connected by bolts 25 and together forming a rectangular bearing 26 for the corresponding bar. These bushings are held longitudinally in place by transverse bars 27, which themselves are suitably fastened to the main frame. A cross-brace consisting of a channel bar 28 extends across the opening 17 for supporting the upper portions of the sides of chamber 16, as shown in Fig. 20.

An opening 29 is formed in the front portion of the bottom plate 22 which communicates with a die-receiving space 30 in which latter is located the die 31 which will be further described in detail, and the front upper portion of the chamber is covered by the plate 32 and the cross-piece 33.

*Operation of pressure - chamber and plunger.*—The plunger is reciprocated simultaneously with the rotation of the pugging-shaft, as will further appear, and as the clay is forced into the pressure chamber by the wiper, it is forced forward into the inclosed front portion thereof whence it can find exit only through the opening 29 and thus is forced into the die 31.

*Construction of plunger.*—As before noted, the plunger is mounted upon the ends of two bars, Figs. 20 and 22, and has been referred to in a general way as a vertical transverse plate. Instead of being formed of a single plate, however, it is formed from a multiplicity of small plates 34 placed side by side, Fig. 13, and secured by means of bolts 35 to a transverse angle-bar 36 resting upon a transverse bottom wearing plate 37. The angle bar is secured to the plunger bar 38 by eye-bolts 39, and the angle bar and bottom wearing plate are secured to each other and to the plunger by bolts 40, Figs. 10 and 15.

By means of this construction, the accidental presence of an obstruction such as a stone, in the pressure chamber, which would result in the deformation or destruction of the entire plunger plate, will ordinarily deform or destroy but one or two of the small plates and thus reduce the damage caused by such obstruction to a minimum.

*Means for varying the pressure in the pressure-chamber.*—To effect this result, the plate 32, previously referred to and forming part of the top of the front and inclosed portion of the pressure-chamber, is made vertically and adjustably movable whereby, as will thus be readily seen, the volume of said portion of such chamber and consequently the pressure therein may be varied. To this end the plate 32 is secured by means of angles 41, to the lower ends, respectively, of two vertical bars 42, whose upper portions are provided with threads 43. These threads are engaged respectively, by nuts 44 which are provided with gears or sprocket-wheels 45 around which passes an endless chain 46. This chain also passes around a sprocket pinion 47, Fig. 21 secured to the upper end of a vertical shaft 48 mounted in bearings 49 suitably secured to the adjacent fixed parts of the machine, as shown in Figs. 5 and 20. The lower end of said shaft is provided with a hand-wheel 50. The nuts 44 are held against longitudinal movement along the threaded portions of the bars 42, by suitable fixed cross-pieces 51, 51.

*Operation of pressure-varying means.*—The turning of the hand-wheels will rotate the pinion 47 thus moving the chain 46 and rotating the sprockets or gears 45. This causes the nuts to rotate and being fixed vertically they raise or lower the bars 42 according to the direction of rotation, thus raising or lowering the plate 32 and correspondingly expanding or contracting the volume of the pressure-chamber as desired.

*The plunger rod and means for varying the stroke thereof.*—To further effect a variation and control of the action of the plunger in the pressure-chamber, I provide means additional to those already described and which consist primarily of means for varying the length of the stroke of the plunger.

The plunger-rod consists of two parts, a primary part and a secondary part. The primary part consists of the connecting rod 52, Figs. 3, 8 and 9, and a cross-head 53 mounted in a slide-way 54 fixed to the frame with which the front end of said connecting-rod articulates. The rear end of the connecting-rod is connected with the crank-shaft 10, Figs. 1, 2 and 8, by which it is reciprocated.

Fixed to the cross-head and extending in the direction of reciprocation thereof, is a bar 55, the fixed connection being formed by a block 116, Figs. 11 and 12, bolted onto said cross-head, as shown in said figures.

The secondary part of the plunger-rod consists of the two bars 38, previously referred to, together with a transversely adjustable stepped-block 56. This block is mounted to slide transversely in a guide-way 57 which is bolted onto said bars, as clearly illustrated by Figs. 8, 9 and 14. Said block is formed with a plurality of steps 58 and these steps as shown lie respectively in different vertical transverse planes. The block is so positioned that by transverse movement thereof any one of these steps may be interposed in the path of the front end of the fixed bar 55.

Figure 17:
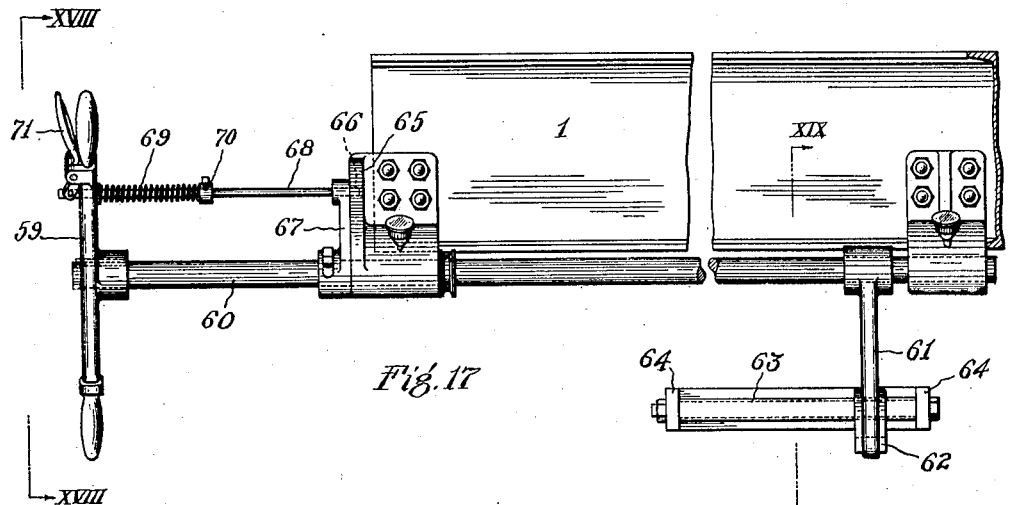
Fig. 17 represents a broken fragmentary side elevation of the plunger rod actuating mechanism and viewed in the direction indicated by the arrow in Fig. 5.
Figure 18:
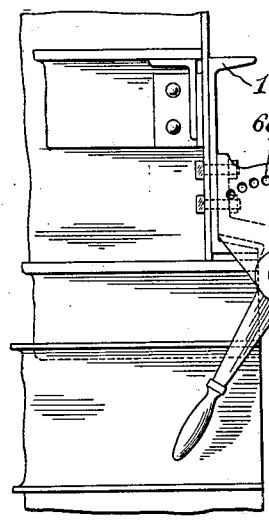
Fig. 18 represents a front elevation of the mechanism shown in Fig. 17.
Figure 19:
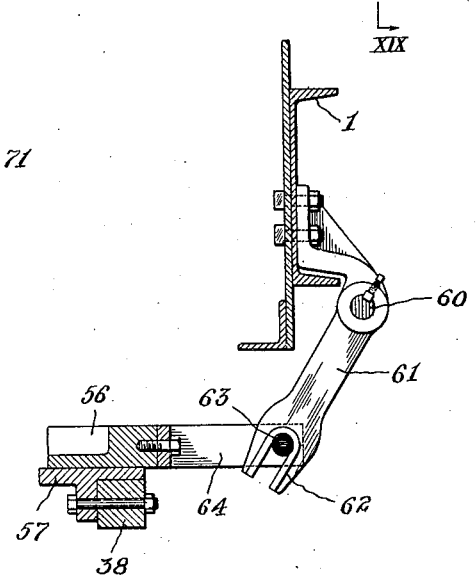
Fig. 19 represents a section taken upon the planes indicated by the line XIX—XIX in Fig. 17.

The transverse movement referred to is effected by a hand-lever 59, Figs. 5, 17 and 18 which is secured to a shaft 60 carrying a fixed arm 61 the outer or free end of which is provided with a fork 62. This fork slidably engages a longitudinal rod 63 mounted upon arms 64, 64, extending laterally from the block 56. It will then be seen that by turning the shaft 60 upon its axis by means of lever 59, the block may be moved into the desired transverse position. In order to punctuate these positions properly, I provide a segment 65, fixed to the frame, Figs. 17 and 18, formed with a plurality of holes 66 corresponding in number and position with the number and position of the steps 58. Fixed to said shaft is an arm 67 whose free end forms a bearing for a locking-bar 68 adapted to engage any one of the holes 66. This rod tends to effect such engagement through the agency of a helical spring 69 interposed between a collar 70 fixed to said bar 68, and the lever 59. The movement to be effected counter to that produced by the said spring is effected by means of a spring-actuated hand piece 71, mounted on the lever, as will be readily understood, and which is pivotally mounted upon the outer end of said bar 68.

The rear ends respectively of the plunger-bars 38, pass through and slide in the cross-heads 53, and have their rear ends respectively provided with stops 72 which limit such sliding movement.

*Operation of plunger-rod and controlling means.*—Assuming the parts to be in the position shown in Fig. 8, that is at the end of the forward stroke of the plunger, the rotation of the crank-shaft 10, will cause the cross-head to engage the stops 72 and pull the secondary part of the plunger-rod and the plunger back. Further movement of the crank-shaft reverses the movement of the connecting-rod and the cross-head moves forward imparting the opposite movement to the plunger. In the position illustrated, the two parts of the plunger-rod are practically fixed, since the fixed bar 55 is engaging the outer end stop, the position of the latter being such as to effect such fixity. A given and maximum length of a stroke is thus produced. Should it be desired to shorten the stroke so as to vary the pressure in the pressure chamber, the block 56 is shifted laterally by the previously described shifting mechanism so as to bring another and desired step into the path of movement of the end of said bar 55. Such a different position is illustrated by Fig. 9. Under such conditions, the forward movement of cross-head 53 and bar 55 produces, as before, a forward movement of the plunger. When the cross-head is retracted, however, the secondary plunger-bar part remains stationary until the cross-head engages the stops 72, when the plunger retraction follows. A given amount of lost motion is thus produced, which is reflected in a shortening of the stroke, as will be understood.

During such operation the elongated bearing provided by rod 63 slides on the fork 61.

*Die.*—As has been previously pointed out immediately below the opening 29 in the pressure chamber, is the die-receiving space 30 in which is placed the die 31. The latter rests upon and is supported by the molds which are fed in from the rear successively as will be hereinafter specifically described. The said die consists of a main metal rectangular frame forming the sides 73, front 74, back 75 and intermediate partitions 76 forming a plurality of compartments 77, Figs. 23 and 24. The top of the frame and the partitions is beveled as shown and bolts pass through the partitions and secure the wearing plates 78 to the bottom of the die, as shown in Fig. 28. The compartments pass completely through the die as shown in Fig. 30. The front of the die is of greater height than the rear and when the die is in place, packing 79 is placed between the outer beveled surface of the top of the sides, front and back of the main frame, as shown in Fig. 30. The front of the die is formed with a projecting portion 80 which extends through an opening 81 formed in the machine, which opening communicates with the space 30. In this projecting portion are formed a plurality of rectangular passageways 82 corresponding in number with the mold compartments 77 and of the same width. Each such passage-way is normally closed by a block or "stone-door" 83 which is preferably formed of two parts, a main or body-part 84 and a lower wearing plate 85 bolted together as shown. Each such stone-door is normally held in place by a vertical rupturable pin 86 preferably of wood, Fig. 29. These doors are provided so as to present a yielding element capable of being removed by an obstruction such as a stone, too large to pass out from under the die, when the mold is ejected, as shown in Fig. 30. When such a condition arises, the stone engages the stone-door and when the mold is ejected, the wooden pin is ruptured, thus permitting the door to be pushed outwardly and the stone to pass through the passage-way 82, as illustrated in said Fig. 30.

The front extension 80 is furthermore formed with two downwardly extending integral arms 87, 87, Figs. 23, 24, 27 and 28, one on each side. The lower end of each arm is formed with a hole 88, conical in form and having its larger diameter at the rear as shown in dotted lines in Fig. 27. Through these holes extend two long bolts 89, 89, respectively, which pass through vertically elongated holes 90, formed in the front flanges of two side upright frame channel bars 2ª, 2ª, respectively, and then through holes 91 formed in the rear flanges thereof, these latter holes being of substantially the same diameter as the bolts. Nuts 92 hold the bolts in position as shown. By means of the last-described construction, the die is held against removal and at the same time permitted to oscillate on the rear end of the bolts and also on the front ends thereof, thereby imparting a certain amount of flexibility to the die which permits it to respond to the application of various stresses to which it is subjected during the performance of its function and as has been found advantageous.

For facilitating the placing of the die in proper position in the die-receiving space, I provide on each side thereof a guiding block 108, Figs. 29, 31 and 32, which are removably secured by means of bolts 109, to the side pieces 110 of the frame. Each of these blocks is provided with an inclined surface 111, lying in a plane perpendicular to the plane of mold travel but inclined with relation thereto and with a stop-shoulder 112. The transverse distance between shoulders 112 is less than the width of the die but the distance between the main lateral inner surfaces 113, of the block, is somewhat greater than such width, and said shoulders lie in a position above that occupied by the die when in its normal functioning position.

When it is desired to place the die in position, the front plate 20 is loosened by removing the securing bolts 20ª and swung upwardly and outwardly into the position shown in dotted lines in Fig. 20 in which position it is held by any suitable means such as for instance a counterweight 114. The die is then pushed into the mold-receiving space resting upon the mold-supporting plates, no molds being in this position at this time. In this position the upper lateral parts of the die are located in front of and adjacent to the inclined surfaces 111, one of such lateral parts of the die being alined with one of such surfaces. By pushing the die in farther from this position, such inclined surface will be engaged, thus causing the die to be pushed laterally one way or the other according to the particular surface engaged and thus centered. From this position it may be raised sufficiently so as to insert a mold beneath it, which mold is then used to support the die. The shoulders 112 prevent the die from moving upwardly too far.

Figure 34:
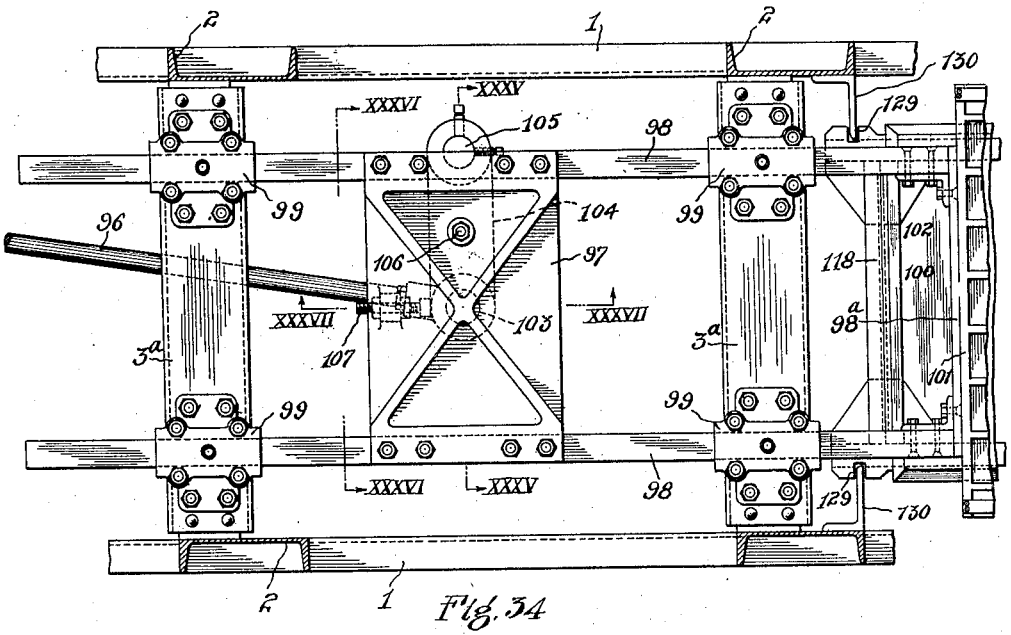
Fig. 34 represents an enlarged section taken upon the plane indicated by line IV—IV in Fig. 1.
Figure 38:
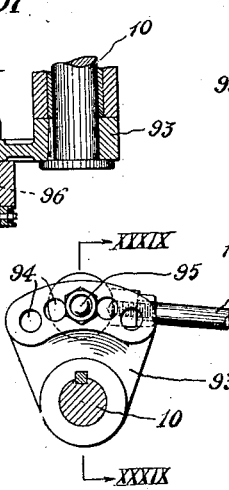
Fig. 38 represents, upon an enlarged scale, a plan view of the crank which articulates with the connecting rod operating the ejector mechanism.

*The feeding and ejecting mechanism.*— To the lower end of the crank-shaft 10 is secured a segmental crank-arm 93 provided with a plurality of holes 94 adapted to receive a wrist-pin 95 which connects the rear end of the ejector connecting-rod 96 therewith, as shown in Figs. 4 and 38. The front end of said connecting-rod articulates with a plate 97 which is bolted onto two ejector-bars 98, 98, and these latter are slidably mounted in bearings 99, mounted upon two transverse frame members 3ª, 3ª, Fig. 34. These bars are horizontally alined with the space 100 which receives the molds 101 and which is located immediately above the mold-supporting plates 102, 102, Fig. 41. The molds are fed in from the side of the machine into the said space 100, either by hand or by suitable automatically operating mechanism, and the front ends of bars 98, reciprocate in said space. The front ends of the bars have secured thereto the transverse ejector plate 98ª. As a result of such reciprocation, the molds are successively pushed under the die 31, and then by the following reciprocatory movement of said bars, pushed out from under same and so delivered from the machine. The molds so delivered will have been filled with clay, as will be understood, and may be received by hand or upon a suitable conveyer (not shown). The plunger mechanism and feeding and ejecting mechanism connecting-rods are so connected with the crank-shaft 10 that the plunger operates first to compress the clay in the pressure-chamber, and extrude it through the die-compartments into the mold compartments, after which the feeding and ejecting operation takes place.

Figures 35, 37:
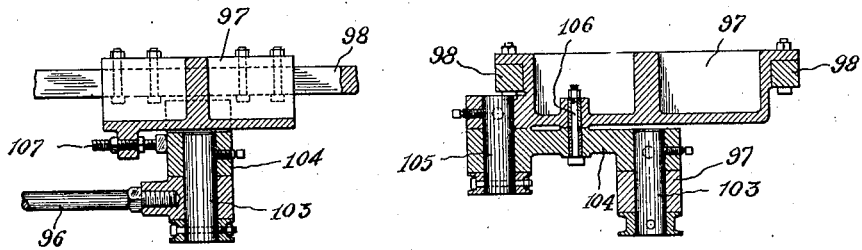
Fig. 35 represents a section taken upon the plane indicated by the line XXXV—XXXV in Fig. 34.
Fig. 37 represents a section taken upon the plane indicated by line XXXVII—XXXVII in Fig. 34.
Figures 36, 39:
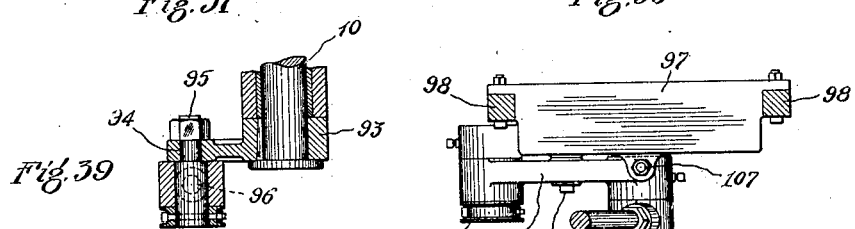
Fig. 36 represents a section taken upon the plane indicated by line XXXVI—XXXVI in Fig. 34.
Fig. 39 represents a section taken upon the plane indicated by line XXXIX—XXXIX in Fig. 38.

The front end of the ejector connecting-rod 96 is mounted upon a wrist-pin 103, Fig. 35, which is fixed in the end of the arm 104 pivoted upon pin 105 fixed to the plate 97. This arm is normally fixed with respect to said plate, by a rupturable pin 106. By means of this construction, should the ejector-bars encounter, in the performance of their function, any unusual or abnormal obstruction, the pin 106 will shear off and allow the arm 104 to oscillate and the connecting-rod 96 to reciprocate while permitting the bars 98 to remain at rest, thus preventing a serious breakage of other parts of the mechanism, as will be understood. However, the backward oscillatory movement of the said arm 104 is limited by means of an adjustable stop screw 107, Fig. 37, so that the first backward movement of said arm, after such a rupture of pin 106 has been effected, will effect the withdrawal of bars 98 from the mold-receiving space, leaving the latter free, in which position they will remain until the machine can be stopped and the obstruction removed, and the parts restored to their normal condition by supplying a new pin 106.

*Mold-adjusting mechanism.*—For convenience in handling, I make the main supporting-member of two separate plates 102, as shown in Figs. 40 and 41. These plates rest laterally upon a frame consisting of two longitudinal horizontal frame-pieces 117, 117, and cross-pieces 118. This frame has secured upon its lower surface four plates 119, two on each side and the latter rest upon four cams 120. These cams are mounted in pairs upon two transverse cam-shafts 121, 121, rotating in suitable bearings 122, fixed to the frame. Upon corresponding ends of these shafts are secured sprocket-wheels 123, around which runs an endless sprocket-chain 124. Upon the upper portion of the chains are fixed two angle-pieces 125, 125, engaged respectively by two nuts 126, 126. A screw 127 passes through the pieces 125, and is engaged by said nuts, thus securing the screw and chain to each other, Fig. 42. A hand-wheel 128 provided with a threaded hub, is suitably fixed against longitudinal displacement, and engages said screw. By turning hand-wheel 128, it will be seen that the chain 124 may be moved and sprocket-wheels 123 rotated, thus moving cams 120 and raising or lowering the mold-supporting frame and hence the mold-supporting plates 102, as may be desired.

In order to insure the correct vertical movement of the cam plates 119, they are provided with laterally placed grooves 129 which engage the flanges of vertically placed angle plates 130, as shown in Fig. 40. Furthermore, the cam-shafts 121 are vertically adjustable, the bearings 122 being vertically slidable and resting upon adjusting screws 131.

I have also provided, as is usual, a buffer 132, as shown in Fig. 40, for receiving the impact of the molds as they are fed in transversely, as will also be readily understood by those skilled in the art.

The channel 28, in addition to bracing the sides of the pressure-chamber also by reason of its location coöperates with the plunger 21 to shear the clay above, during the return stroke of said plunger. As will be noted from the preceding description and the drawings, Figs. 2 and 20, the said channel extends transversely and may be considered to intersect the opening 17. Since the pugging shaft 6 and the wiper 15 are in continuous operation, clay will be forced substantially continuously into the pressure-chamber 16 and hence such action occurs when the plunger is in its extreme forward position, as illustrated in said Fig. 2. Clay is hence forced down upon the plunger rods and fills the chamber behind the plates 34. When the latter retracts, they coöperate with member 28 to shear the clay in front of said member, and force the clay in the chamber up through the rear portion of said opening 17 back into the pugging receptacle 13. This leaves always a solid mass of clay immediately below the wiper and causes the latter to operate always at maximum capacity, thus contributing to the efficiency of operation of the machine. I have found that when the channel 28 is omitted, voids are formed below the wiper as a result of the shifting of the clay, which depreciate the wiper's capacity for properly filling the pressure-chamber, as will be readily understood by those skilled in the art.

Having fully described my invention, what I claim and desire to secure by Letters Patent is:

1. In a brick-making machine, the combination of a horizontally movable plunger; horizontally movable plunger rods comprising a primary rod secured to a transversely arranged cross-head; two parallel bars connected to said plunger adapted to slidingly engage said cross-head; an auxiliary bar fixedly secured to the cross-head adjacent the primary rod; and a stepped member being adjustable transversely and lying in the path of movement of said fixed auxiliary bar.

2. In a brick-making machine, the combination of a main frame; a pressure chamber; a plunger slidable in the latter; horizontally movable plunger rods comprising a primary rod secured to a transversely arranged slidable cross-head; two parallel bars connected to the plunger head adapted to slidingly engage said cross head, an auxiliary bar fixedly secured to the cross-head adjacent the primary rod, and a stepped member slidably mounted in said parallel bars intermediate the plunger and said cross-head, said stepped member being adapted to fix and vary the limits of movement of the plunger.

3. In a brick-making machine, the combination of a horizontally movable plunger-rod the parts of which are movable relatively to each other within fixed limits; of a transversely slidable member adapted to vary said limits, and means for adjusting said slidable member comprising an elongated bearing rod secured to said member, a pivotally mounted shaft, an arm fixed to said shaft provided with a fork at its free end adapted to slidably engage said elongated bearing rod, and means for actuating said shaft.

4. In a brick-making machine, the combination with a two-part plunger rod, the parts of which are movable relatively to each other within fixed limits, of a transversely adjustable member provided with a plurality of steps adapted to fix one of the limits of such relative movement, whereby each limit may be varied, and means for adjusting said member consisting of an elongated bearing rod secured to said member, a pivotally mounted shaft, an arm fixedly secured to said shaft provided with a fork at its free end adapted to slidingly engage said elongated bearing rod, and means for operating said shaft.

5. In a brick-making machine, the combination of a main frame; a pressure-chamber; a plunger slidable in the latter; two bars extending through one wall of said chamber and having said plunger secured to their front ends; a slideway mounted in said main frame; a slidable cross-head mounted transversely on said slideway; said bars extending and slidable through said cross-head and having stopping means secured to their rear ends; a bar fixedly secured to said cross-head; and a transversely adjustable stepped member mounted upon said two first-named bars intermediate said plunger and cross-head and lying in the path of movement of the end of said fixedly secured bar.

6. In a brick-making machine, the combination of a suitable frame; a pugging mill mounted upon the latter; a suitable die beneath said mill; a pressure chamber located intermediately of said mill and die; a horizontally mounted plunger rod and a plunger connected therewith, said plunger coöperating with said pressure chamber to force the contents of the latter into said die, said plunger including a stepped member; means for shifting said stepped member transversely with reference to the direction of movement of said plunger rod, said means including an elongated bearing rod secured to said stepped member, a shaft pivotally mounted upon the frame, an arm fixed to said shaft and provided at its free end with a fork adapted slidably to engage said elongated bearing rod, and means for actuating said shaft; means for feeding the contents of the pugging mill to the pressure chamber; a crank shaft mounted on the frame and connected with the plunger rod; and suitable gearing for actuating the crankshaft.

7. In a brick-making machine, the combination of a suitable frame; a pugging mill mounted upon the latter; a suitable die beneath said mill; a pressure chamber located intermediately of said mill and die; a horizontally mounted plunger rod and a plunger connected therewith, said plunger coöperating with said pressure chamber to force the contents of the latter into said die, said plunger including a stepped member; means for shifting said stepped member transversely with reference to the direction of movement of said plunger rod, said means including an elongated bearing rod secured to said stepped member, a shaft pivotally mounted upon the frame, an arm fixed to said shaft and provided at its free end with a fork adapted slidably to engage said elongated bearing rod, means for actuating said shaft, a segment secured to the frame and formed with holes corresponding to the number and position of stops upon said stepped member, and means actuated by said shaft-actuating means and adapted to register with said holes; means for feeding the contents of the pugging mill to the pressure chamber; a crank-shaft mounted on the frame and connected with the plunger rod; and suitable gearing for actuating the crankshaft.

Signed by me, this 17th day of September, 1917.

ARTHUR O. DUPUY.